United States Patent [19]

Dowty

[11] 4,162,825
[45] Jul. 31, 1979

[54] METHOD FOR ADJUSTING THE RADIUS OF CURVATURE OF A SPHERICAL MIRROR

[75] Inventor: James R. Dowty, Newport Beach, Calif.

[73] Assignee: Ford Aerospace & Communications Corp., Dearborn, Mich.

[21] Appl. No.: 822,176

[22] Filed: Aug. 5, 1977

[51] Int. Cl.² ............................................. G02B 5/10
[52] U.S. Cl. .................................... 350/295; 126/270
[58] Field of Search ............... 350/295, 296, 278, 180, 350/293; D10/111, 109; D23/72; 248/289 A; 204/19

[56] References Cited

U.S. PATENT DOCUMENTS

| | | | |
|---|---|---|---|
| 2,982,179 | 5/1961 | Lace | 350/295 |
| 3,031,928 | 5/1962 | Kopito | 350/295 |
| 3,254,342 | 5/1966 | Miller | 350/295 |
| 3,261,016 | 7/1966 | Burr | 350/310 |
| 3,893,755 | 7/1975 | Cobarg et al. | 350/295 |
| 4,043,644 | 8/1977 | Humphrey | 350/295 |
| 4,059,346 | 11/1977 | Levine et al. | 350/295 |
| 4,091,274 | 5/1978 | Angelbech et al. | 350/295 |
| 4,093,351 | 6/1978 | Perkins et al. | 350/295 |

Primary Examiner—John K. Corbin
Assistant Examiner—B. W. de los Reye
Attorney, Agent, or Firm—Paul K. Godwin, Jr.; Clifford L. Sadler

[57] ABSTRACT

A method and apparatus for controlling the astigmatic focusing of a spherical mirror by adjusting the radius of curvature configuration thereof. Adjustment is made by applying a couple to the outer edge of the spherical mirror. A floating support mechanism prevents distortion of the variable curvature mirror as it is oriented at different tracking angles by applying a positive fluid pressure to the convex back surface of the mirror.

2 Claims, 4 Drawing Figures

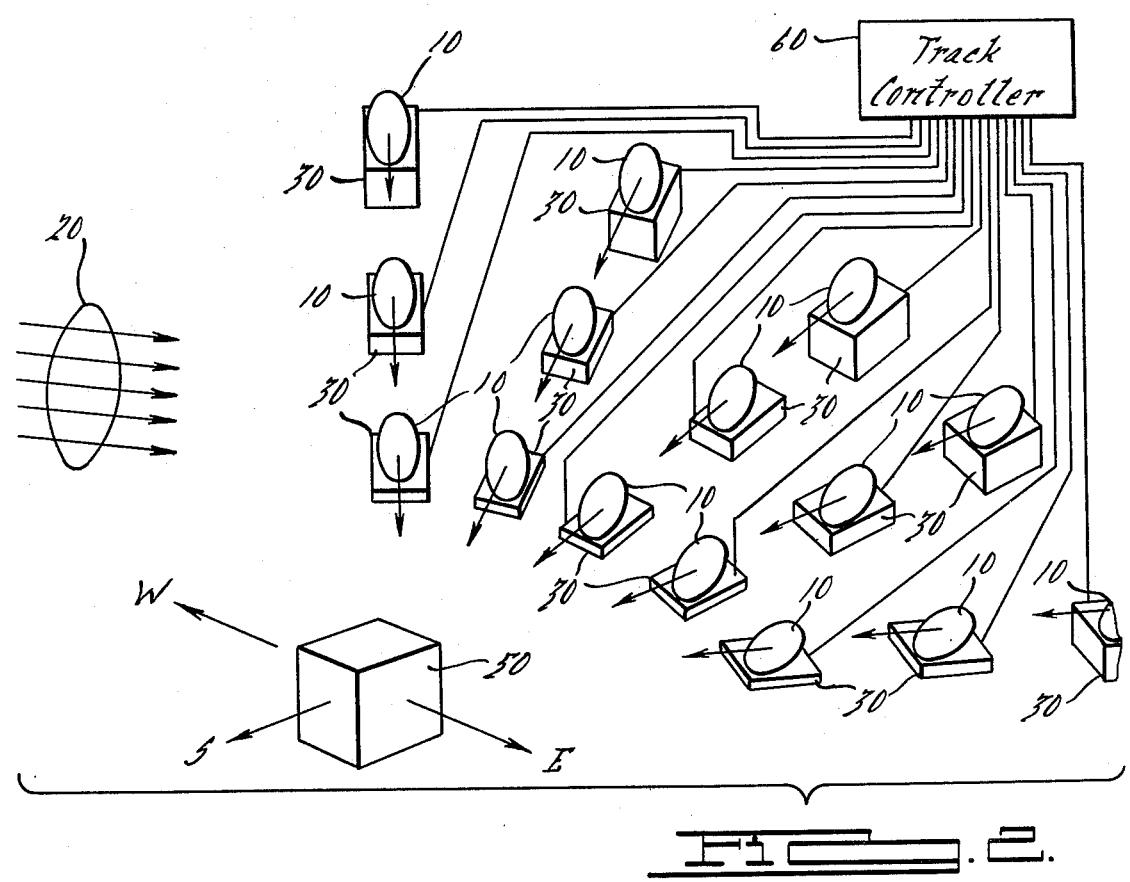
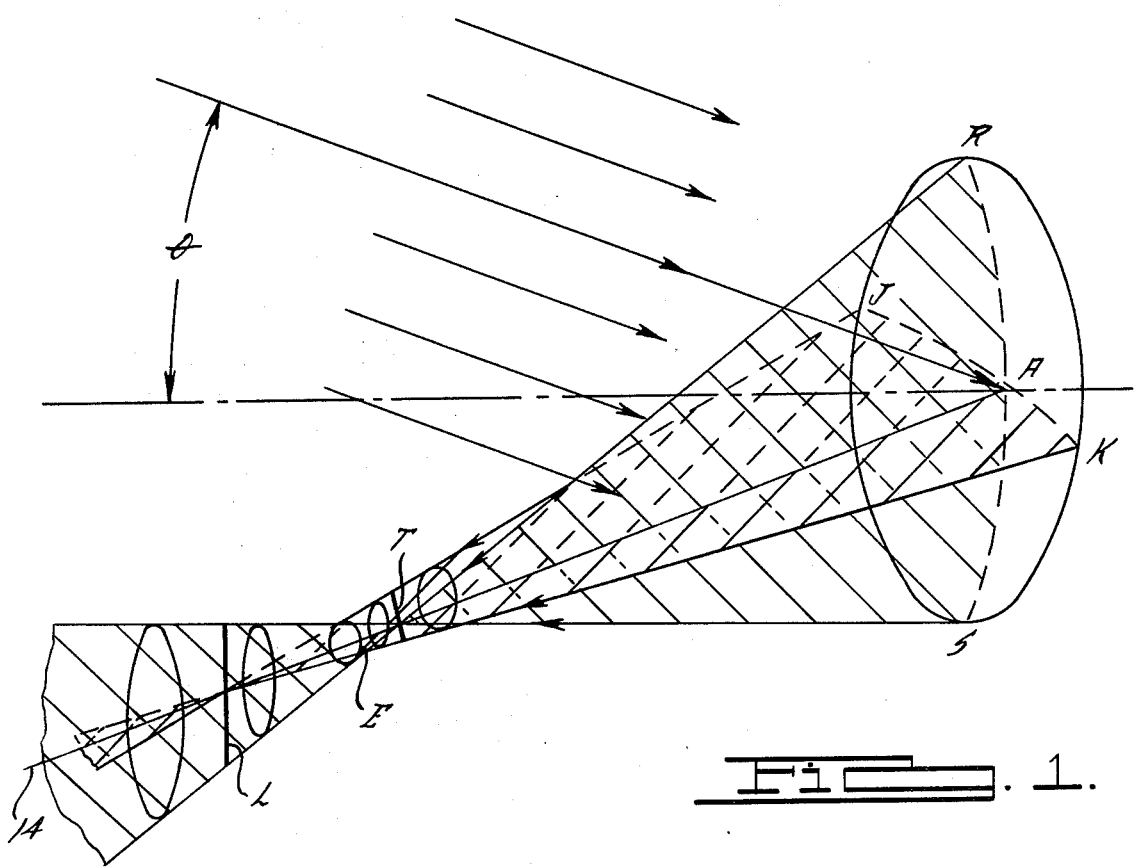

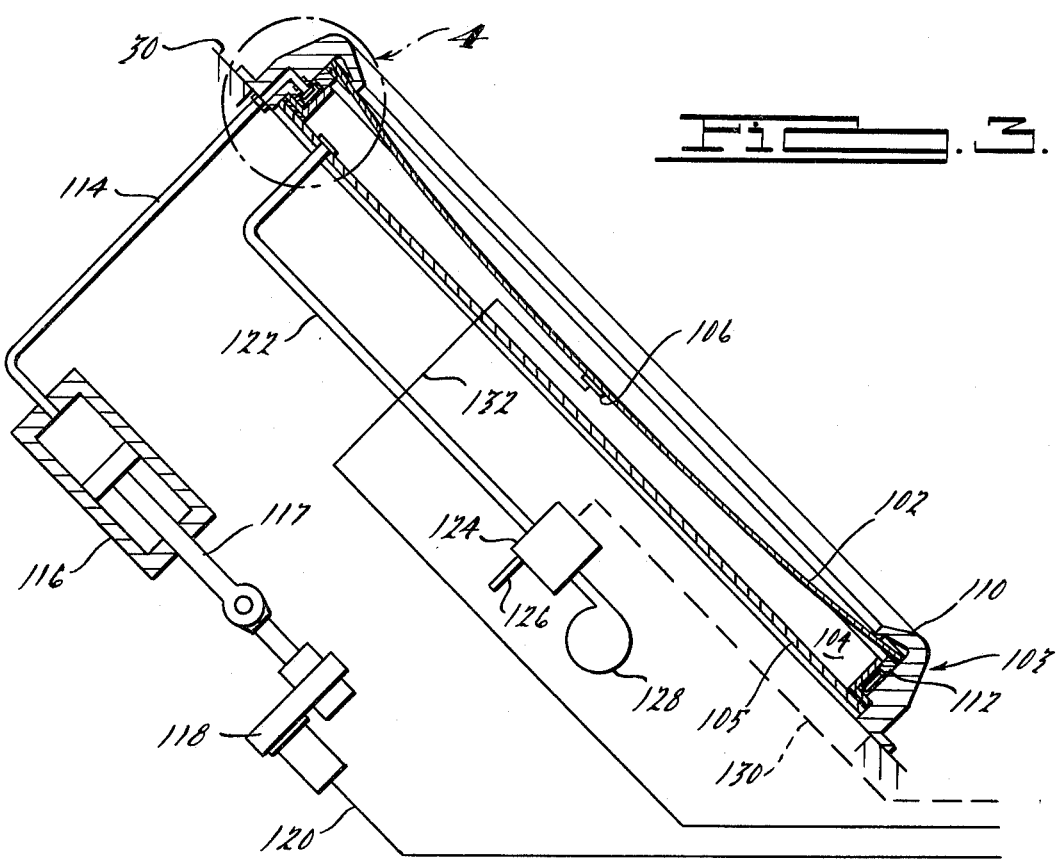
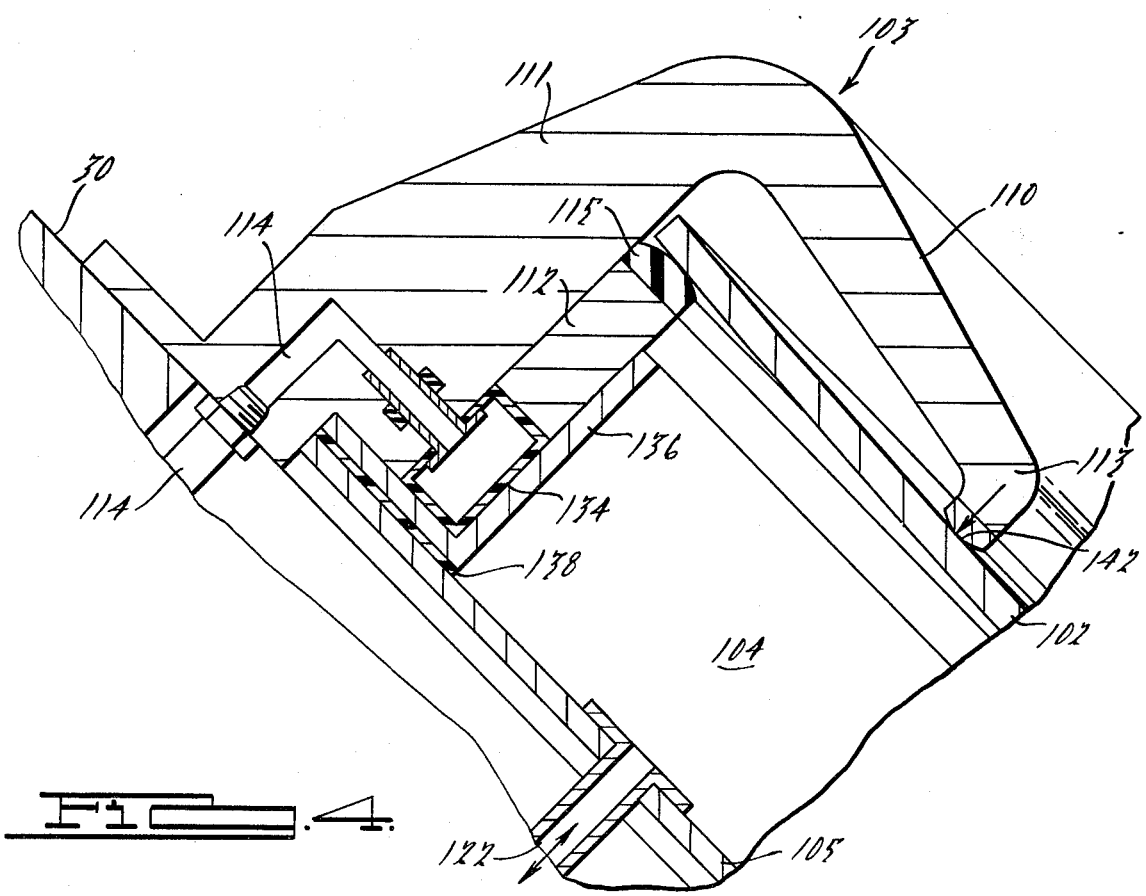

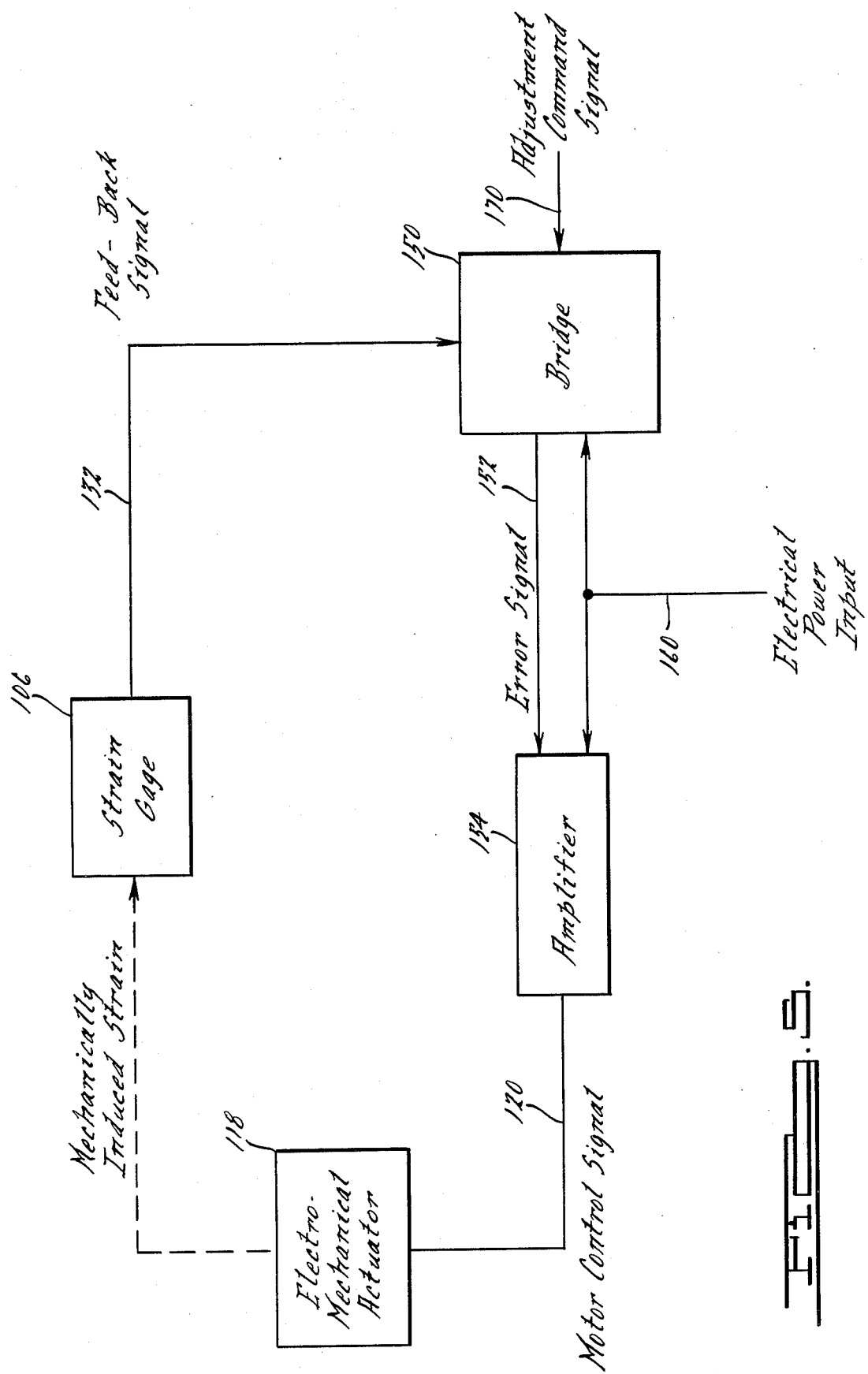

METHOD FOR ADJUSTING THE RADIUS OF CURVATURE OF A SPHERICAL MIRROR

BACKGROUND OF THE INVENTION

1. Field of the Invention

The present invention generally relates to the field of changing the optical characteristics of an energy focusing system and more specifically relates to changing the focal length of an imaging mirror as employed in a solar collector field.

2. Description of the Prior Art

Solar collection systems are generally constructed so as to receive radiant energy from the sun and convert it to heat or electrical energy. In each system, it is an object thereof to obtain the greatest concentration of energy using the minimum number and least costly elements. In many installations, where great intensity of solar energy is required, focal elements such as lenses or mirrors are employed to concentrate the solar radiation onto a receiver.

Spherical mirrors are chosen in some solar collector installations for their individual ability to receive radiation from an off-axis source and reflectively focus that radiation to a relatively small area. However, spherical mirrors are unable to focus an image of an off-axis point source of radiation at infinity to a single point because of an inherent astigmatism. Therefore, the optimum results one can expect from a spherical mirror is to focus the off-axis radiation to a relatively small and stably oriented area. The smallest stably oriented area is termed the "circle of least confusion" and is shown in FIG. 1 as being the optimum focus of an off-axis point source at infinity occuring in a plane perpendicular to the axis of a focused bundle of light rays.

In FIG. 1, a spherical mirror 10 is shown having a central axis 12, along which a center of curvature C and a focal point P lie. The distance from the center of curvature C to the point A where the central axis 12 intersects the spherical mirror 10 is defined as the radius of curvature for the spherical mirror 10. The focal length of the mirror is related to the radius of curvature as one-half the radius of curvature. Therefore, $\overline{PA} = \overline{CA}/2$ for radiation received along a path parallel to the central axis 12.

Two orthogonal planes of reflection are shown in FIG. 2, which extend from the reflective surface of the spherical mirror 10 to illustrate the problem of astigmatic aberration of the focused image when the spherical mirror 10 is oriented so that the incident solar radiation is at an angle $\theta$ with respect to the central axis 12. A first plane extending from the dashed line R, S represents how rays of radiation impinging along line R, S are focused at a point T along the line 14 extending from point A. Line 14 represents the fixed direction to which the focused bundle of rays, from the mirror 10 to a fixed target, are maintained during track with a corresponding change in $\theta$. A second plane extending from dashed line J, K perpendicular to and intersecting line R, S at point A, represents how rays of radiation incident along line J, K are focused at a point L on the line 14 extending from point A. As is evident from the FIG. 1 illustration, the astigmatism of the spherical mirror causes a first line focus of energy to be made intersecting point T and a second line focus of energy to be made, orthogonal to the first line of focus, intersecting point L. Between the first and second lines of focused energy, along a plane mutually perpendicular to the aforementioned first and second orthogonal planes extending from the mirror 10, the energy is focused in a circle E which is defined as the "circle of least confusion".

It has been found that although the circle of least confusion is the most ideal concentration of energy for a spherical mirror, as the angle $\theta$ changes, the distance along line 14 from A, to E changes.

Until now, such a change in the distance was either tolerated as an inherent deficiency in thermal transfer or compensated for by using additional mirrors and their associated heliostat mounting mechanisms to increase the amount of collected energy.

SUMMARY OF THE INVENTION

The present invention is intended to intensify the solar radiation directed to thermal receivers of solar power generating systems and thereby minimize the number of mirrors required to produce a given output. In order to achieve the intended result, the present invention was conceived as a method of maintaining the circle of least confusion optimally located at a fixed receiver by changing the radius of curvature of the spherical mirror of the solar collector as the incident angle $\theta$ between the incoming rays of solar radiation and the central axis varies throughout the day.

The present invention, is designed to achieve the above result by providing a novel floating support mechanism whereby a circular shaped spherical mirror (approximately 5 to 10 feet in diameter) is maintained in an undistorted spherical configuration while at the same time being adjustable to change its radius of curvature.

The present invention also provides a mechanism for applying a couple to the edge of a spherical mirror in order to change its radius of curvature and thereby effect the focal point and circle of least confusion location with respect to the mirror.

Of course, the present invention is seen as having a wider application than to that of solar energy collection, since it is basically a method and apparatus for changing the radius of curvature of a spherical mirror by applying a couple to the edge of the mirror.

In the present invention, a circularly shaped spherical mirror is mounted on a heliostat by suspension about its circular edge. An air chamber is formed between the rear convex side of the mirror and the heliostat for receiving a positive air pressure to provide a continuous support for the mass of the mirror and thereby maintain the mirror in an undistorted spherical curvature. An air pressure control system is connected to the chamber and supplies a control pressure to the convex side of the mirror dependent upon the vertical angle the mirror is tilted as it tracks the sun.

The suspension of the mirror by its circular edge is achieved by a circular ring element containing a mechanism which responds to a control signal and applies a circularly distributed couple to the edge of the mirror. This couple causes the mirror to change its radius of curvature and thereby allow for "fine tuning" of the circle of least confusion at the receiver.

It is an object of the present invention to provide a method of adjusting the focal length of a spherical mirror.

It is another object of the present invention to provide a novel apparatus for controlling the radius of curvature of a spherical mirror.

It is a further object of the present invention to provide a floating support mechanism to maintain the set curvature configuration of a variable radius of curvature spherical mirror.

It is a further object of the present invention to provide a novel reflector for a solar collection system whereby, although the distance between the mirror and the receiver is relatively fixed, the mirror has an adjustable radius of curvature to maintain the circle of least confusion concentration of radiation at the receiver while the mirror tracks the sun across the sky.

BRIEF DESCRIPTION OF THE DRAWINGS

FIG. 1 is a geometrical diagram for illustrating the astigmatic aberrations which are inherent in a spherical mirror of the type employed in the present invention.

FIG. 2 is an illustration of a solar collection field whereby each reflector is individually mounted to track and to focus the sun's radiation at a central fixed receiver.

FIG. 3 is a cross-sectional diagram showing an operational embodiment of the present invention.

FIG. 4 is a detailed cross-sectional diagram showing the suspension mechanism for applying the couple to the edge of the spherical mirror.

DETAILED DESCRIPTION OF THE INVENTION

The present invention is an improvement to a solar collection system such as that shown in FIG. 2, which employs a concentrating collector field 40 made up of a plurality of spherical mirrors 10 individually mounted and controlled to track the sun throughout the day so as to keep their focused rays concentrated on a thermal receiver 50. The receiver 50, such as a solar oven or thermal engine, is fixed with respect to each of the spherical mirrors and is oriented to receive the concentrated energy from the mirrors 10, as they track the sun. Each of the spherical mirrors 10 in the concentrating collector field 40 has its radius of curvature of a sufficient dimension to effect concentration of a bundle of rays from the solar radiation 20 onto the face of the receiver 50.

In the embodiment of the overall system shown in FIG. 2, each mirror 10 is of a spherical type having a circular configuration and mounted for tracking on a heliostat 30. Each heliostat 30 responds to a corresponding output from a track controller 60, which predetermines the orientation of each mirror according to the day of the year and the time of day in order to maintain the concentrated bundle of rays, reflected from each mirror, at the face of the receiver 50. Of course, the object of the present invention is to maximize the amount of energy contributed by each mirror by fine tuning its respective radius of curvature according to a preprogrammed function, which determines the optimum radius of curvature for each mirror as it tracks the sun during each day.

An embodiment of the present invention, which is used to support a mirror 10 on a heliostat 30 is shown in FIG. 3. A spherical mirror element 102, having a circular configuration, a preformed spherical curvature and a concave reflective surface is suspended from a circular suspension mounting ring 103. In this embodiment, the mirror element 102 is approximately 5 to 10 feet in diameter and is made of a commercially available soda lime float glass having a thickness of approximately 3/16 to ¼ inch. (It should be understood that the above dimensions are only given to describe one embodiment of the present invention and do not serve to limit the scope of the invention from incorporating mirrors of other dimensions.)

The suspension mounting ring 103 comprises a circular load reaction ring 110 and a loading ring 112. The load reaction ring 110 is mounted on the heliostat 30 and is configured to have a circular support portion 111 extending from the heliostat 30 and to have an arm portion 113 extending radially inward from the circular support portion 111. A contact tip 142 is formed at the radially innermost edge of the arm 113 for contacting the concave surface of the mirror element 102.

The loading ring 112 is mounted within the circular dimensions of the circular support portion 111 and has a contact tip 115 formed at one of the circular edges thereof for contacting the outermost edge of the convex surface of the mirror element 102. The circular mirror element 102 is mounted in the suspension mounting ring 103, and is held in place by contacting the circular support portion 111 and circular contact tips 142 and 115. In this configuration, the diameter of the circular support portion 111 serves to maintain the mirror element 102 in a stable mounting configuration throughout many different angles of orientation.

In order to change the radius of curvature of the mirror 102, a couple is applied to the edge of the mirror. To apply a couple in this embodiment, the contact tip 142, defining a circular locus of contact points on the arm portion 113, is relatively fixed with respect to the concave surface of the mirror. A vector of force is directed toward the concave surface of the mirror 102 about the circular locus of points defined by contact tip 142 in reaction to a vector of force applied to the convex surface at the extreme outer edge of the mirror 102 through a circular locus of points defined by contact tip 115. In this case, the loading ring 112 is controllable to apply the vector force and resultant couple, as is required to change the radius of curvature of the mirror 102.

The loading ring 112 is controlled for applying an even distribution of force around the circular mirror 102 by a hydraulic system which is responsive to a control signal from a circuit described below. The hydraulic system includes a circular chamber 134, which allows the circular loading ring 112 to slide therein. The chamber 134 is formed by an internal circular wall of the support portion 111 and a circular wall element 136. The loading ring 112 is mounted between the internal circular wall of the support portion 111 and the wall element 136. A hydraulic line 114 is connected to the chamber 134 for supplying hydraulic fluid from a pressurizing cylinder 116. A piston 117 is mounted within the pressurizing cylinder 116 and has its movement controlled by an electromechanical actuator 118. The electromechanical actuator includes a DC reversable drive motor, which responds to an input signal 120 and drives a geared element for controlling the movement of the piston 117.

Since the mirror 102 is mounted by suspension about its peripheral edge, it is apparent that, as the heliostat 30 causes the mirror to change its angular orientation with respect to the gravitational forces, the mirror 102 would, without further support of its mass, sag and distort according to its reoriented weight distribution. Therefore, in order to prevent distortion of the mirror's spherical curvature, a positive air pressure is applied to the convex side of the mirror 102. Therefore, when the mirror axis extending normal from the center of the mirror 102 is parallel with the gravitational force vector, the weight of the mirror is evenly distributed and the amount of distortion is minimal. However, some distortion from the true spherical curvature will occur and it is necessary to apply a small amount of positive air pressure to support the mirror.

To effect the air pressure support in the above embodiment, a gas pressure line 122 is connected into a chamber 104 formed between the convex surface of the mirror 102 and the upper surface 105 of the heliostat 30. Air pressure is supplied to the chamber 104 by a pump 128 connected to a control valve 124. Either an electrical or mechanical control line may be used to adjust the control valve 124 according to the angle setting of the heliostat 30.

The amount of air pressure which must necessarily be applied to the chamber 104 is calibrated for each mirror 10 in the field 40. The calibration takes place over the full range of angular orientation which will be encountered by the mirror as the heliostat 30 causes it to track the sun. Since the amount of air pressure will thereafter be dependent upon the angle of orientation, the adjustment of the control valve 124 may be preprogrammed by connection to follow a cam or be connected to an angular monitoring device which provides feedback and positive control.

A strain gage 106 is mounted on the mirror 102 to provide a means for sensing change in the radius of curvature of the mirror. An electrical line 132 is connected to the strain gage 106 to provide electrical feedback connection to a bridge 150 of a control circuit shown in FIG. 3.

The control circuit shown in FIG. 3, includes the strain gage 106, the feedback line 132 and the bridge circuit 150. The bridge circuit 150 receives an adjustment command signal 170 from a preprogrammed means, such as an analog computer, which changes the adjustment command signal in accordance with the day of the year and time of day. The bridge circuit 150 is of conventional design and supplies an error signal between the adjustment command signal 170 and the feedback signal along line 132 to an amplifier 154. The amplifier 154 provides an output signal to the electromechanical actuator 18 which in turn causes the couple to be applied about the circular edge of the mirror 102. The applied couple is mechanically felt by the strain gage 106 and thereby changes the feedback signal along line 132 to the bridge 150. Therefore, when the feedback signal on line 132 is equivalent to the adjustment command signal 170, the signal output from the amplifier 154 has a zero value and the applied couple to the edge of the spherical mirror 102 is maintained.

Thereafter, as the angle θ changes, due to the tracking of the heliostat 30, the adjustment command signal 170 changes and thereby causes an imbalance in the bridge 50. This imbalance is amplified to cause the couple to be properly applied in order to optimally adjust the radius of curvature of the spherical mirror 102 for an efficient energy transfer to the receiver.

Although the above embodiment is described as applying a couple to the outer edge of the spherical mirror 102 by employing a relatively fixed contact point on the concave side of the mirror and the load applying contact point on the convex side, it is readily apparent that the functions of those two contact points could be exchanged without varying from the basic concept of the present invention. In such an exchange of functions, the relatively fixed contact point is located near the outer edge of the mirror contacting the convex side and the load applying contact point is located radially inward from the relatively fixed point and contacts the concave side of the mirror.

What I claim is:

1. A method of adjusting the radius of curvature of a spherical mirror defined by a reflective concave front surface and a convex back surface with a common surrounding edge, including the steps of:

providing a relatively fixed element having a defined circular locus of contact points at a first diameter in contact with one of said surfaces of said mirrors;

providing a forming element having a defined circular locus of contact points concentric with said fixed element contact points at a second diameter different than said first diameter in contact with the other surface of said mirror;

applying a couple to said spherical mirror through said forcing element and said fixed element to adjust the radius of curvature of said spherical mirror;

monitoring said radius adjustment and generating an electrical signal in response thereto;

generating a command signal indicative of a desired amount of mirror adjustment;

comparing said monitoring signal with said command signal to generate a difference signal;

employing said difference signal to control the amount of adjustment in said couple applying step; and wherein said relatively fixed element is provided in contact with said concave surface and said forcing element is provided having a circular locus of contact points at a second diameter larger than said first diameter and contacting said convex surface of said mirror.

2. A method of adjusting the radius of curvature of a spherical mirror defined by a reflective concave front surface and a convex back surface with a common surrounding edge, including the steps of:

providing a relatively fixed element having a defined circular locus of contact points at a first diameter in contact with one of said surfaces of said mirror;

providing a forcing element having a defined circular locus of contact points concentric with said fixed element contact points at a second diameter different than said first diameter in contact with the other surface of said mirror;

applying a couple to said spherical mirror through said forcing element and said fixed element to adjust the radius of curvature of said spherical mirror;

monitoring said radius adjustment and generating an electrical signal in response thereto;

generating a command signal indicative of a desired amount of mirror adjustment;

comparing said monitoring signal with said command signal to generate a difference signal;

employing said difference signal to control the amount of adjustment in said couple applying step; and wherein said relatively fixed element is provided in contact with said convex surface of said mirror and said forcing element is provided having a circular locus of contact points at a second diameter smaller than said first diameter and contacting said concave surface of said mirror.

* * * * *